United States Patent
Ko et al.

(10) Patent No.: US 9,384,869 B2
(45) Date of Patent: *Jul. 5, 2016

(54) ANISOTROPIC CONDUCTIVE FILM, COMPOSITION FOR THE SAME, AND APPARATUS INCLUDING THE SAME

(71) Applicants: Youn Jo Ko, Uiwang-si (KR); Dong Seon Uh, Uiwang-si (KR); Jang Hyun Cho, Uiwang-si (KR); Jin Seong Park, Uiwang-si (KR); Sang Sik Bae, Uiwang-si (KR); Jin Kyu Kim, Uiwang-si (KR)

(72) Inventors: Youn Jo Ko, Uiwang-si (KR); Dong Seon Uh, Uiwang-si (KR); Jang Hyun Cho, Uiwang-si (KR); Jin Seong Park, Uiwang-si (KR); Sang Sik Bae, Uiwang-si (KR); Jin Kyu Kim, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 199 days.

This patent is subject to a terminal disclaimer.

(21) Appl. No.: 14/050,555

(22) Filed: Oct. 10, 2013

(65) Prior Publication Data

US 2014/0034882 A1 Feb. 6, 2014

Related U.S. Application Data

(63) Continuation of application No. 13/241,811, filed on Sep. 23, 2011, now Pat. No. 8,608,985.

(30) Foreign Application Priority Data

Dec. 29, 2010 (KR) .......................... 10-2010-0138221

(51) Int. Cl.
| | |
|---|---|
| *H01B 1/24* | (2006.01) |
| *C09J 9/02* | (2006.01) |
| *H05K 3/00* | (2006.01) |
| *C09J 175/16* | (2006.01) |
| *H01B 1/12* | (2006.01) |

(52) U.S. Cl.
CPC ...... *H01B 1/24* (2013.01); *C09J 9/02* (2013.01); *C09J 175/16* (2013.01); *H01B 1/12* (2013.01)

(58) Field of Classification Search
CPC .............. H01B 1/00; H01B 1/22; H01B 1/24; H01L 2224/48227; H01L 2224/73265; H01L 2924/01; H01L 2924/01047; H05K 3/23; H05K 2201/0224; H05K 2201/0332
See application file for complete search history.

(56) References Cited

U.S. PATENT DOCUMENTS

| | | | | |
|---|---|---|---|---|
| 5,336,443 | A * | 8/1994 | Odashima ................. | 252/511 |
| 5,686,703 | A | 11/1997 | Yamaguchi | |
| 6,690,564 | B1 * | 2/2004 | Haruta et al. .............. | 361/212 |
| 7,452,923 | B2 | 11/2008 | Jeon et al. | |
| 8,608,985 | B2 * | 12/2013 | Ko et al. .................... | 252/512 |
| 2003/0178221 | A1 | 9/2003 | Chiu et al. | |
| 2011/0155430 | A1 * | 6/2011 | Lee et al. ................... | 174/257 |

FOREIGN PATENT DOCUMENTS

EP     2 180 026 A1   4/2010

* cited by examiner

*Primary Examiner* — Mark Kopec
(74) *Attorney, Agent, or Firm* — Lee & Morse, P.C.

(57) ABSTRACT

An anisotropic conductive film includes a binder part, a curing part, an initiator, and conductive particles, wherein the binder part includes at least one of a nitrile butadiene rubber (NBR) resin and a urethane resin, wherein the anisotropic conductive film has an electrical conductivity of more than 0 μS/cm to about 100 μS/cm.

19 Claims, No Drawings

ANISOTROPIC CONDUCTIVE FILM, COMPOSITION FOR THE SAME, AND APPARATUS INCLUDING THE SAME

CROSS REFERENCE TO RELATED APPLICATION

This is a continuation application based on pending application Ser. No. 13/241,811, filed Sep. 23, 2011 (now U.S. Pat. No. 8,608,985), the entire contents of which is hereby incorporated by reference.

BACKGROUND

1. Field

Embodiments relate to an anisotropic conductive film, an anisotropic conductive film composition for the same and an apparatus including the same.

2. Description of the Related Art

An anisotropic conductive film is an adhesive film in which conductive particles, such as, for example, metal particles of nickel, gold, etc., or polymer particles coated with such metals are dispersed. When the anisotropic conductive film is disposed between circuits to be connected and is subjected to heat and pressure under predetermined conditions, circuit terminals are electrically connected by the conductive particles. A pitch between adjacent circuits may be filled with an insulating adhesive resin, such that the conductive particles do not contact one another, providing strong insulating properties.

SUMMARY

According to an embodiment, there is provided an anisotropic conductive film including a binder part, a curing part, an initiator, and conductive particles, wherein the binder part includes at least one of a nitrile butadiene rubber (NBR) resin and a urethane resin, the anisotropic conductive film has an electrical conductivity of more than 0 μS/cm to about 100 μS/cm.

The anisotropic conductive film may have an ion content of more than 0 ppm to about 100 ppm.

The anisotropic conductive film may have an ion content of more than 0 ppm to about 50 ppm.

The binder part may include the NBR resin, and the NBR resin may have an ion content of more than 0 ppm to about 100 ppm.

The binder part may include the urethane resin, and the urethane resin may have an ion content of more than 0 ppm to about 100 ppm.

The binder part may further include an acrylic resin.

The binder part may include about 20 to about 80% by weight (wt %) of the acrylic resin and about 20 to about 80 wt % of the NBR resin, the NBR resin having an ion content of more than 0 ppm to about 100 ppm.

The binder part may include about 20 to about 80 wt % of the acrylic resin and about 20 to about 80 wt % of the urethane resin, the urethane resin having an ion content of more than 0 ppm to about 100 ppm.

The binder part may include about 20 to about 90 wt % of the acrylic resin, about 5 to about 55 wt % of the NBR resin, the NBR resin having an ion content of more than 0 ppm to about 100 ppm and about 5 to about 40 wt % of the urethane resin, the urethane resin having an ion content of more than 0 ppm to about 100 ppm.

The binder part may further include at least one thermoplastic resin selected from acrylonitrile, polyamide, olefin and silicone resins.

The curing part may include at least one of a urethane (meth)acrylate and a (meth)acrylate monomer.

The initiator may include a radical initiator.

The anisotropic conductive film may include about 20 to about 78 wt % of the binder part, about 20 to about 50 wt % of the curing part, about 1 to about 10 wt % of the radical initiator and about 1 to about 20 wt % of the conductive particles in a solid state.

The anisotropic conductive film may further include a polyurethane bead.

The polyurethane bead may include an ion-exchanged polyurethane bead.

The polyurethane bead may have an ion content of more than 0 ppm to about 10 ppm.

The polyurethane bead may be included in an amount of about 1 to about 10 parts by weight based on 100 parts by weight of the anisotropic conductive film in terms of solid content.

According to an embodiment, there is provided a composition for an anisotropic conductive film, the composition including a binder part, a curing part, an initiator, and conductive particles. The binder part may include at least one of a nitrile butadiene rubber (NBR) resin and a urethane resin. The composition may have an ion content of more than 0 about 100 ppm.

According to an embodiment, there is provided a anisotropic conductive film that is a product of the composition for an anisotropic conductive film. The anisotropic conductive film may have an electrical conductivity of more than 0 μS/cm to about 100 μS/cm.

According to an embodiment, there is provided an apparatus including the anisotropic conductive film.

DETAILED DESCRIPTION

Korean Patent Application No. 10-2010-0138221, filed on Dec. 29, 2010, in the Korean Intellectual Property Office, and entitled: "Anisotropic Conductive Film, Composition for the Same, and Apparatus Including the Same," is incorporated by reference herein in its entirety.

Example embodiments will now be described more fully hereinafter; however, embodiments may be embodied in different forms and should not be construed as limited to the example embodiments set forth herein. Rather, these embodiments are provided so that this disclosure will be thorough and complete, and will fully convey the scope of the invention to those skilled in the art.

In one embodiment, an anisotropic conductive film includes a binder part, a curing part, an initiator, and conductive particles and has an ion content of more than 0 ppm to about 100 ppm. Specifically, the ion content may be more than about 0 and less than about 50 ppm. In this case, a corrosion possibility in a metal electrode decreases, thereby improving reliability.

The ion content of the anisotropic conductive film may be measured by ion chromatography using an automated combustion system.

The anisotropic conductive film may be manufactured using a plurality of components including a binder part, conductive particles, and the like. Thus, a conventional method of measuring the ion content of each component and the ion content of the entire film may not be effective to determine whether corrosion occurs under the application of voltage and current when the film is actually connected to a circuit. Therefore, the electrical conductivity of the anisotropic conductive film may be measured in advance to identify whether the conductivity is more than 0 μS/cm to about 100 μS/cm, thereby determining in advance whether corrosion will occur between components when the anisotropic conductive film is connected to the circuit. The electrical conductivity may be measured by any suitable method. For example, about 0.4 g of an adhesive film may be put into about 20 g of deionized water (DIW) and boiled at about 100° C. for about 10 hours, after which the electrical conductivity of ions dissolved in the water may be measured using a conductivity meter. Other methods may be used. Specifically, the electrical conductivity may be in a range from more than 0 μS/cm to about 30 μS/cm.

Binder Part

The binder part may function as a matrix of the anisotropic conductive film and may include at least one of a nitrile butadiene rubber (NBR) resin and a urethane resin.

The binder part may be present in the anisotropic conductive film in an amount of about 20 to about 78 wt % in terms of solid content. Within this range, excellent film formability may be obtained and electrical conductivity may not become high. Specifically, the amount of the binder part may be about 30 to about 75 wt %.

Herein, the term "ion" refers to ions produced in a process of manufacturing a copolymer resin or a bead through polymerization of monomers or the like. For example, the term "ion" may include $Na^+$ and $Cl^-$ ions, without being limited thereto.

The ion content may be measured by any suitable method, such as, for example, ion chromatography using an automated combustion system.

The NBR resin may have an ion content of more than 0 ppm to about 100 ppm. Within this range, the anisotropic conductive film may have low electrical conductivity and may not cause corrosion when connected to a circuit. Specifically, the ion content may be more than about 0 and less than about 20 ppm.

The NBR resin having an ion content of more than 0 ppm to about 100 ppm may be produced by ion exchange treatment of an NBR resin. For example, the NBR resin may be produced by a dilution process in which an NBR resin is diluted with a solvent having a low solubility for the NBR resin but favorably dissolving ions or the like, to eliminate ion impurities, without being limited thereto. For example, the solvent may be MeOH. Through ion exchange treatment, the ion content of the NBR resin may be reduced.

The NBR resin may be a copolymer produced by emulsion polymerization of acrylonitrile and butadiene. The content of acrylonitrile and the content of butadiene may be appropriately selected. The polymerization method may be appropriately selected.

The NBR resin may have a weight average molecular weight of about 50,000 to about 2,000,000 g/mol.

The urethane resin may have an ion content of more than 0 ppm to about 100 ppm. Within this range, the anisotropic conductive film may have a low electrical conductivity and may not cause corrosion when connected to a circuit. Specifically, the ion content may be more than about 0 and less than about 10 ppm.

The urethane resin having an ion content of more than 0 ppm to about 100 ppm may be produced by ion exchange treatment of a urethane resin. For example, the urethane resin may be produced by a dilution process using methyl ethyl ketone in the same manner as the NBR resin, without being limited thereto. Through ion exchange treatment, the ion content of the urethane resin may be reduced.

The urethane resin may be a polymer resin having a urethane bond and produced by polymerization of isophorone diisocyanate and polytetramethylene glycol, without being limited thereto.

The urethane resin may have a weight average molecular weight of about 50,000 to about 2,000,000 g/mol.

The binder part may further include an acrylic resin.

The acrylic resin may have a glass transition temperature of about 30 to about 120° C. and may have an acid value of about 0-150 mgKOH/mg.

The acrylic resin may have a weight average molecular weight of about 50,000 to about 2,000,000 g/mol. Within this range, appropriate tack properties may be obtained, enabling proper formation of a film, excellent compatibility with components included in the curing part may be secured and phase separation may not occur.

The acrylic resin may be produced by polymerization of a (meth)acrylic monomer and/or a monomer polymerizable therewith. For example, the acrylic resin may be prepared by polymerization of at least one monomer selected from (meth)acrylate, (meth)acrylic acid, vinyl acetate, and acrylic monomers or modifications thereof which have a C2 to C10 alkyl group. The polymerization may be conducted by any suitable method.

The acrylic resin may be present in the binder part in an amount of about 20 to about 90 wt %, preferably about 20 to about 80 wt % in terms of solid content. Within this range, proper film formability can be secured.

In one embodiment, the binder part may include the acrylic resin and the NBR resin having an ion content of more than 0 ppm to about 100 ppm. In this case, the binder part may include about 20 to about 80 wt % of the acrylic resin and about 20 to about 80 wt % of the NBR resin having an ion content of more than 0 ppm to about 100 ppm in terms of solid content. Within this range, excellent film formability may be obtained, and electrical conductivity may not be high, so that corrosion may not occur when connected to a circuit. Specifically, the binder part may include about 30 to about 70 wt % of the acrylic resin and about 30 to about 70 wt % of the NBR resin having an ion content of more than 0 ppm to about 100 ppm in terms of solid content.

The binder part may further include a urethane resin that is not subjected to ion exchange treatment, or a urethane resin having an ion content greater than about 100 ppm. These resins may be included in a content of about 1 to about 10 parts by weight based on about 100 parts by weight of the binder part. Within this range, the electrical conductivity of a film may not become high.

In another embodiment, the binder part may include the acrylic resin and the urethane resin having an ion content of more than 0 ppm to about 100 ppm. In this case, the binder part may include about 20 to about 80 wt % of the acrylic resin and about 20 to about 80 wt % of the urethane resin having an ion content of more than 0 ppm to about 100 ppm in terms of solid content. Within this range, excellent film formability may be obtained, and electrical conductivity may not be high, so that corrosion may not occur when connected to a circuit. Specifically, the binder part may include about 30 to about 70 wt % of the acrylic resin and about 30 to about 70 wt % of the urethane resin having an ion content of more than 0 ppm to about 100 ppm in terms of solid content.

The binder part may further include an NBR resin that is not subjected to an ion exchange treatment or an NBR resin having an ion content greater than about 100 ppm. These resins may be included in a content of about 1 to about 10 parts by weight based on about 100 parts by weight of the binder part. Within this range, the electrical conductivity of a film may not become high.

In a further embodiment, the binder part may include the acrylic resin, the NBR resin having an ion content of more than 0 ppm to about 100 ppm, and the urethane resin having an ion content of more than 0 ppm to about 100 ppm. In this case, the binder part may include about 20 to about 90 wt % of the acrylic resin, about 5 to about 55 wt % of the NBR resin having an ion content of more than 0 ppm to about 100 ppm, and about 5 to about 40 wt % of the urethane resin having an ion content of more than 0 ppm to about 100 ppm in terms of solid content. Within this range, excellent film formability can be obtained, and electrical conductivity may not be high, so that corrosion may not occur when connected to a circuit. Specifically, the binder part may include about 20 to about 40 wt % of the acrylic resin, about 30 to about 55 wt % of the NBR resin having an ion content of more than 0 ppm to about 100 ppm, and about 30 to about 40 wt % of the urethane resin having an ion content of more than 0 ppm to about 100 ppm in terms of solid content.

In the film according to embodiments, the binder part may further include a thermoplastic resin included in a binder of an anisotropic conductive film. For example, the thermoplastic resin may include at least one of acrylonitrile, polyamide, olefin, and silicone resins, without being limited thereto.

Curing Part

The anisotropic conductive film according to embodiments may include at least one of urethane (meth)acrylates and (meth)acrylate monomers.

The curing part may be present in the anisotropic conductive film in an amount of about 20 to about 50 wt % in terms of solid content. Within this range, excellent properties in terms of adhesion, appearance, etc., can be obtained, and reliability and stability can be obtained. Specifically, the amount may be about 23 to about 40 wt %.

The urethane (meth)acrylates include a urethane bond and a double bond at opposite terminals. The urethane (meth)acrylates may be polymeric materials produced by any suitable polymerization method.

The urethane (meth)acrylate may have a weight average molecular weight of about 500 to about 30,000 g/mol. Within this range, proper film formability and excellent compatibility may be obtained.

The urethane (meth)acrylate may be present in the anisotropic conductive film in an amount of about 10 to about 30 wt %, preferably about 20 to about 30 wt % in terms of solid content. Within this range, the anisotropic conductive film can have excellent compatibility.

The (meth)acrylate monomers may serve as a diluent. The (meth)acrylate monomers may include at least one of 1,6-hexanediol mono(meth)acrylate, 2-hydroxyethyl (meth)acrylate, 2-hydroxypropyl (meth)acrylate, 2-hydroxybutyl (meth)acrylate, 2-hydroxy-3-phenyloxypropyl (meth)acrylate, 1,4-butanediol (meth)acrylate, 2-hydroxyethyl (meth)acryloyl phosphate, 4-hydroxycyclohexyl (meth)acrylate, neopentyl glycol mono(meth)acrylate, trimethylolethane di(meth)acrylate, trimethylolpropane di(meth)acrylate, pentaerythritol tri(meth)acrylate, dipentaerythritol penta(meth)acrylate, pentaerythritol hexa(meth)acrylate, dipentaerythritol hexa(meth)acrylate, glycerin di(meth)acrylate, hydrofurfuryl (meth)acrylate, isodecyl (meth)acrylate, 2-(2-ethoxyethoxy)ethyl (meth)acrylate, stearyl (meth)acrylate, lauryl (meth)acrylate, 2-phenoxyethyl (meth)acrylate, isobornyl (meth)acrylate, tridecyl (meth)acrylate, ethoxylated nonylphenol (meth)acrylate, ethylene glycol di(meth)acrylate, triethylene glycol di(meth)acrylate, tetraethylene glycol di(meth)acrylate, polyethylene glycol di(meth)acrylate, 1,3-butylene glycol di(meth)acrylate, tripropylene glycol di(meth)acrylate, ethoxylated bisphenol A di(meth)acrylate, cyclohexanedimethanol di(meth)acrylate, phenoxy t-glycol (meth)acrylate, 2-methacryloyloxymethyl phosphate, 2-methacryloyloxyethyl phosphate, dimethyloltricyclodecane di(meth)acrylate, trimethylolpropane benzoate acrylate and mixtures thereof, without being limited thereto.

The (meth)acrylate monomers may be present in the anisotropic conductive film in an amount of about 10 to about 20 wt % in terms of solid content. Within this range, the anisotropic conductive film may have high connection reliability.

The curing part may further include acetals, carbodiimides, or the like in addition to at least one of urethane (meth)acrylates and (meth)acrylate monomers.

Initiators

The anisotropic conductive film may include an initiator, such as, for example, a radical initiator. The radical initiator may include a photopolymerization initiator, a heat-curing initiator and a mixture thereof. Specifically, a heat-curing initiator may be used.

The initiator may be present in the anisotropic conductive film in an amount of about 1 to about 10 wt % in terms of solid content. Within this range, sufficient reaction for curing may be performed and excellent properties in terms of adhesion and reliability may be obtained with proper molecular weight after bonding. Specifically, the amount may be about 1 to about 5 wt %.

The heat-curing initiator may include, without being limited to, peroxide and azo initiators. Examples of the peroxide initiator may include, without being limited to, lauryl peroxide, benzoyl peroxide and cumene hydroperoxide. Examples of the azo initiator may include, without being limited to, 2,2'-azobis(4-methoxy-2,4-dimethylvaleronitrile), dimethyl-2,2'-azobis(2-methylpropionate) and 2,2'-azobis(N-cyclohexyl-2-methyl-propionamide).

Conductive Particles

The anisotropic conductive film includes the conductive particles used as fillers to impart conductive performance.

The conductive particles may be present in the anisotropic conductive film in an amount of about 1 to about 30 wt % in terms of solid content. Within this range, electric conduction may be properly performed, and short circuits may be prevented. The amount of the conductive particles may be properly determined based on uses of the anisotropic conductive film and may substantially differ. Specifically, the amount may be about 1 to about 20 wt %.

The conductive particles may include at least one of metal particles including gold, silver, nickel, copper or solder metals; carbon particles; metal-coated resin particles, such as particles of polyethylene, polypropylene, polyester, polystyrene, polyvinyl alcohol, or a modified resin thereof, coated with gold, silver, nickel, copper or solder metals; and insulated conductive particles obtained by coating the metal-coated resin particles with insulating particles.

The conductive particles may have a diameter of about 1 to about 20 μM, without being limited thereto, in view of adhesion and connection reliability.

The anisotropic conductive film may further include polyurethane beads. The polyurethane beads may be spherical organic fine particles of a cross-linked urethane resin.

The polyurethane beads may be included in the binder part along with the acrylic resin, the NBR resin having an ion content of more than 0 ppm to about 100 ppm and/or the urethane resin having an ion content of more than 0 ppm to about 100 ppm.

Polyurethane beads that are subjected to ion exchange treatment may be used. The ion exchange treatment of the polyurethane beads may be conducted by any suitable method, e.g., a dilution process using a solvent or a process using a monomer that does not generate residual ions. Through the ion exchange treatment, the ion content of the polyurethane bead may be decreased and preferably may be more than about 0 and less than about 10 ppm. Within this range, the electrical conductivity of the film may not become high, and corrosion may not occur when connected to a circuit.

The polyurethane beads may have a diameter of about 0.5 to about 10 μm without being limited thereto.

The polyurethane beads may be present in an amount of about 1 to about 10 parts by weight, or specifically, about 1 to about 5 parts by weight, based on about 100 parts by weight of the anisotropic conductive film in terms of solid content. Within this range, the electrical conductivity of the film may not become high and corrosion may not occur when connected to a circuit.

Further, the anisotropic conductive film may further include additives, e.g., a polymerization inhibitor, an antioxidant, a heat stabilizer, etc., in order to provide additional properties without hindering fundamental properties. The additives may be present in the anisotropic conductive film in an amount of about 0.01 to about 10 wt % in terms of solid content, without being limited thereto.

The polymerization inhibitor may be selected from hydroquinone, hydroquinone monomethyl ether, p-benzoquinone, phenothiazine and mixtures thereof. The antioxidant may include phenolic or hydroxycinnamate compounds, e.g., tetrakis[methylene(3,5-di-tert-butyl-4-hydroxycinnamate)] methane and 3,5-bis-(1,1-dimethylethyl)-4-hydroxybenzene propanethiol-di-2,1-ethanediyl ester.

The anisotropic conductive film may be formed of an anisotropic conductive film composition described as follows. The anisotropic conductive film may be manufactured using a suitable device or equipment. For example, the anisotropic conductive film composition may be dissolved in an organic solvent including toluene or the like and liquefied, and then may be stirred for predetermined time at a rate range in which the conductive particles are not ground. The product may be applied onto a release film to a thickness of about 10 to about 50 μm and dried over a predetermined time to volatilize the organic solvent or may be additionally cured using ultraviolet radiation, thereby producing an anisotropic conductive film having a thickness of about 4 to about 40 μm.

In another embodiment, the anisotropic conductive film composition may include a binder part, a curing part, an initiator, and conductive particles, wherein the binder part includes at least one of an NBR resin and a urethane resin, and an anisotropic conductive film formed of the composition has an ion content of more than 0 ppm to about 100 ppm.

The binder part, the curing part, the initiator and the conductive particle are as described above. Further, the anisotropic conductive film composition may include a solvent. The solvent may be an organic solvent, e.g., toluene, without being limited thereto.

In still another embodiment, an apparatus includes the anisotropic conductive film or an anisotropic conductive film formed of the anisotropic conductive film composition. The apparatus may include various types of display apparatuses, e.g., liquid crystal displays (LCD), and semiconductor devices which use anisotropic conductive films as a bonding material between modules.

Next, the embodiments will be described in more detail with reference to the following examples. However, it should be understood that the embodiments are not limited to the illustrated examples and may be embodied in various different ways.

Embodiments that are not included herein will be readily recognized and appreciated by those skilled in the art, and an explanation thereof is omitted.

EXAMPLES

Preparative Example 1

Preparation of NBR Resin Having Ion Content of 10 ppm 100 g of an NBR resin (N-34, Nippon Zeon) was diluted in MeOH to eliminate ion impurities. The ion content of the NBR resin, measured by ion chromatography using an automated combustion system, was decreased from 600 ppm to 10 ppm.

Preparative Example 2

Preparation of Urethane Resin Having Ion Content of 10 ppm 100 g of a urethane resin (NPC7007T, NANUX) was diluted with methyl ethyl ketone to eliminate ion impurities. The ion content of the urethane resin, measured by ion chromatography using an automated combustion system, was decreased from 400 ppm to 10 ppm.

Preparative Example 3

Preparation of Polyurethane Beads Having Ion Content of 10 ppm 100 g of polyurethane beads (MM-101-MS) was diluted with methyl ethyl ketone to eliminate ion impurities. The ion content of the polyurethane beads, measured by ion chromatography using an automated combustion system, was decreased from 500 ppm to 10 ppm.

Example 1

Preparation of Anisotropic Conductive Film Composition

As a binder part serving as a matrix for formation of a film, 24 wt % of acrylic resin (alkyl methacrylate resin (Molecular weight Mw: 90,000 g/mol, Acid value: 2 mgKOH/mg, MMA, BA, cyclohexyl methacrylate copolymer)) and 40 wt % of the NBR resin having an ion content of 10 ppm (N-34, Nippon Zeon) prepared in Preparative Example 1 were used. As a curing part, 25 wt % of urethane acrylate (NPC7007, NANUX) and a reactive monomer of radical polymerizable (meth)acrylate monomers including 1 wt % of 2-methacryloyloxyethyl phosphate, 2 wt % of pentaerythritol tri(meth)acrylate and 2.5 wt % of 2-hydroxyethyl (meth)acrylate were used. 2.5 wt % of lauryl peroxide was used as a heat-curing initiator and 3 wt % of insulated conductive particles (Diameter: 3 μm, Sekisui) were used as a conductive filler. A film composition was prepared using these components.

Examples 2 to 4 and 6

Preparation of Anisotropic Conductive Film Composition

A film composition was prepared in the same manner as in Example 1 except that the composition of the binder was changed as shown in Table 1. As a urethane resin, the urethane resin prepared in Preparative Example 2 was used.

Example 5

Preparation of Anisotropic Conductive Film Composition

A film composition was prepared in the same manner as in Example 1 except that the composition of the binder was changed as shown in Table 1 and the polyurethane bead prepared in Preparative Example 3 was used.

Comparative Examples 1 and 2

Preparation of Anisotropic Conductive Film Composition

A film composition was prepared in the same manner as in Example 1 or 2 except that a non-ion exchanged NBR resin (Ion content: 600 ppm) or a non-ion exchanged urethane resin (Ion content: 400 ppm) was used.

TABLE 1

|  |  | Example |  |  |  |  |  | Comparative Example |  |
|---|---|---|---|---|---|---|---|---|---|
|  |  | 1 | 2 | 3 | 4 | 5 | 6 | 1 | 2 |
| Acrylic resin |  | 24 | 24 | 24 | 24 | 24 | — | 24 | 24 |
| NBR resin | Ion exchanged | 40 | 35 | — | 20 | 37 | 24 | — | — |
|  | Non-ion exchanged | — | — | — | — | — | — | 40 | — |
| Urethane resin | Ion exchanged | — | 5 | 40 | 20 | — | 40 | — | — |
|  | Non-ion exchanged | — | — | — | — | — | — | — | 40 |
| Polyurethane bead (Ion exchanged) |  | — | — | — | — | 3 | — | — | — |
| Curing part + heat-curing initiator + conductive particle |  | 36 | 36 | 36 | 36 | 36 | 36 | 36 | 36 |
| Total |  | 100 | 100 | 100 | 100 | 100 | 100 | 100 | 100 |

Experimental Example

Evaluation of Physical Properties of Anisotropic Conductive Films 100 g of each anisotropic film composition prepared in each of Examples 1 to 6 and Comparative Examples 1 and 2 was dissolved in 20 g of toluene and liquefied, and then was stirred at 25° C. for 1 hour. The product was applied to a release film to a thickness of 16 μm and dried at 70° C. for 15 minutes to volatilize the toluene, thereby producing an anisotropic conductive film. The anisotropic conductive films were evaluated in terms of ion content, electrical conductivity, initial appearance and connection reliability based on whether corrosion occurs after being left at 85° C. and RH 85% for 250 or 500 hours. Results are shown in Table 2.

<Methods of Evaluation of Physical Properties>

1. Ion content: Measured by ion chromatography using an automated combustion system.

2. Electrical conductivity: 0.4 g of each anisotropic conductive film was put in 20 g of purified water and boiled at 100° C. for 10 hours, after which a product liquid was put in a standard conductivity measurement cell having a diameter of 1 cm, followed by measurement of electrical conductivity at a compensation temperature of 25° C. using a conductivity meter (EcoMet C75, Istek)

3. Initial appearance: Each anisotropic conductive film was left at 25° C. for 1 hour. The anisotropic conductive film was connected by temporary pressing at 70° C. for 1 second and by final pressing under 4.5 MPa at 180° C. for 5 seconds using metal electrode glass (Mo/Al/Mo structure, Samsung Electronics) and a chip on film (COF, Samsung Electronics). 10 specimens of each anisotropic conductive film were prepared and evaluated to identify whether an initial abnormality in connection occurred.

4. Reliability: Each anisotropic conductive film was left at 85° C. and RH 85% for 250 or 500 hours, and the appearance was observed to identify whether corrosion occurred.

TABLE 2

|  | Example |  |  |  |  |  | Comparative Example |  |
|---|---|---|---|---|---|---|---|---|
|  | 1 | 2 | 3 | 4 | 5 | 6 | 1 | 2 |
| Ion content after forming film (ppm) | N.D. | N.D. | N.D. | N.D. | N.D. | N.D. | 122 | 108 |
| Electrical conductivity (μS/cm) | 26.7 | 27.2 | 29.6 | 28.7 | 27.8 | 28.1 | 266 | 154 |
| Initial appearance | Normal | Normal | Normal | Normal | Normal | Normal | Normal | Normal |
| Reliability after 250 hours | Normal | Normal | Normal | Normal | Normal | Normal | Corroded | Normal |
| Reliability after 500 hours | Normal | Normal | Normal | Normal | Normal | Normal | Corroded | Corroded |

* N.D.: The automated combustion system performing ion chromatography cannot detect ion concentrations of 30 ppm or less.

As can be seen from Table 2, the anisotropic conductive films according to Examples 1 to 6 do not have a high ion content and electrical conductivity and did not cause corrosion after 500 hours, exhibiting high connection reliability. However, the anisotropic conductive films including the NBR resin or urethane resin, which have an ion content greater than 100 ppm according to Comparative Examples 1 and 2, have a high ion content and electrical conductivity and exhibit unsatisfactory connection reliability.

By way of summation and review, with the recent trend toward light, slim and simple IT devices and flat panel displays having increased resolution, the width of a device circuit becomes narrower. In a conventional circuit having a large width, corrosion occurring in part of a metal electrode in the circuit does not cause a short circuit of the entire circuit. However, in recent circuits having narrower pitches, when corrosion occurs due to a narrow metal electrode in an electrode circuit, it may cause a short circuit, affecting connection reliability Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. An anisotropic conductive film, comprising:
a binder part;
a curing part;
an initiator; and
conductive particles,
wherein the binder part includes at least one of a nitrile butadiene rubber (NBR) resin and a urethane resin, and the anisotropic conductive film produces an electrical conductivity of 1 µS/cm to about 100 µS/cm when 0.4 g of the anisotropic conductive film is put in 20 g of purified water and boiled at 100° C. for 10 hours, after which a product liquid is put in a standard conductivity measurement cell having a diameter of 1 cm, followed by measurement of electrical conductivity at a compensation temperature of 25° C. using a conductivity meter.

2. The anisotropic conductive film as claimed in claim 1, wherein the anisotropic conductive film has an ion content of more than 0 ppm to about 100 ppm.

3. The anisotropic conductive film as claimed in claim 1, wherein the anisotropic conductive film has an ion content of more than 0 ppm to about 50 ppm.

4. The anisotropic conductive film as claimed in claim 1, wherein the binder part includes the NBR resin, and the NBR resin has an ion content of more than 0 ppm to about 100 ppm.

5. The anisotropic conductive film as claimed in claim 1, wherein the binder part includes the urethane resin, and the urethane resin has an ion content of more than 0 ppm to about 100 ppm.

6. The anisotropic conductive film as claimed in claim 1, wherein the binder part further includes an acrylic resin.

7. The anisotropic conductive film as claimed in claim 6, wherein the binder part includes about 20 to about 80% by weight (wt %) of the acrylic resin and about 20 to about 80 wt % of the NBR resin, the NBR resin having an ion content of more than 0 ppm to about 100 ppm.

8. The anisotropic conductive film as claimed in claim 6, wherein the binder part includes about 20 to about 80 wt % of the acrylic resin and about 20 to about 80 wt % of the urethane resin, the urethane resin having an ion content of more than 0 ppm to about 100 ppm.

9. The anisotropic conductive film as claimed in claim 6, wherein the binder part includes about 20 to about 90 wt % of the acrylic resin, about 5 to about 55 wt % of the NBR resin, the NBR resin having an ion content of more than 0 ppm to about 100 ppm, and about 5 to about 40 wt % of the urethane resin, the urethane resin having an ion content of more than 0 ppm to about 100 ppm.

10. The anisotropic conductive film as claimed in claim 1, wherein the binder part further includes at least one thermoplastic resin selected from acrylonitrile, polyamide, olefin and silicone resins.

11. The anisotropic conductive film as claimed in claim 1, wherein the curing part includes at least one of a urethane (meth)acrylate and a (meth)acrylate monomer.

12. The anisotropic conductive film as claimed in claim 1, wherein the initiator includes a radical initiator.

13. The anisotropic conductive film as claimed in claim 1, wherein the anisotropic conductive film includes about 20 to about 78 wt % of the binder part, about 20 to about 50 wt % of the curing part, about 1 to about 10 wt % of the radical initiator and about 1 to about 20 wt % of the conductive particles in a solid state.

14. The anisotropic conductive film as claimed in claim 1, wherein the anisotropic conductive film further includes a polyurethane bead.

15. The anisotropic conductive film as claimed in claim 14, wherein the polyurethane bead includes an ion-exchanged polyurethane bead.

16. The anisotropic conductive film as claimed in claim 14, wherein the polyurethane bead has an ion content of more than 0 ppm to about 10 ppm.

17. The anisotropic conductive film as claimed in claim 14, wherein the polyurethane bead is included in an amount of about 1 to about 10 parts by weight based on 100 parts by weight of the anisotropic conductive film in terms of solid content.

18. An apparatus comprising the anisotropic conductive film as claimed in claim 1.

19. A composition for an anisotropic conductive film, the composition comprising:
a binder part;
a curing part;
an initiator; and
conductive particles,
wherein the binder part includes at least one of an ion exchange treated nitrile butadiene rubber (NBR) resin and an ion exchange treated urethane resin, and the anisotropic conductive film produces an electrical conductivity of 1 µS/cm to about 100 µS/cm when 0.4 g of the anisotropic conductive film is put in 20 g of purified water and boiled at 100° C. for 10 hours, after which a product liquid is put in a standard conductivity measurement cell having a diameter of 1 cm, followed by measurement of electrical conductivity at a compensation temperature of 25° C. using a conductivity meter.

* * * * *